Patented July 12, 1932

1,866,962

UNITED STATES PATENT OFFICE

ELIAS BIELOUSS, OF WASHINGTON, DISTRICT OF COLUMBIA, ASSIGNOR TO HENRY A. GARDNER LABORATORY, INC., OF WASHINGTON, DISTRICT OF COLUMBIA, A CORPORATION OF THE DISTRICT OF COLUMBIA

SYNTHETIC RESINS AND PROCESS OF PREPARING SAME

No Drawing.    Application filed May 17, 1930. Serial No. 453,417.

This invention relates to synthetic resins which combine the properties of the phthalic-ester and phenol-formaldehyde types of resins, and to methods of preparing the same.

It is known that the phthalic acid esters of polyhydric alcohols, including glycol, glycerin, and the like, especially when prepared in the presence of carboxyic acids of high molecular weight, possess valuable properties when used as resins and plasticizers in the manufacture of nitrocellulose lacquers. But the insolubility of these esters in vegetable oils limits their application in the preparation of oil varnishes. They are also not generally compatible with cellulose acetate lacquers. The phenol-formaldehyde resins, on the other hand, when fused with natural gums, such as, for example, rosin, are perfectly soluble in drying oils and are being used extensively in the manufacture of quick drying oil varnishes. But the use of this type of resin is very restricted in cellulose lacquers, on account of their odor, the brittleness of the resulting film, discoloration, of the latter when exposed to atmospheric influences, limited compatibility, and other deficiencies. When certain resinous compositions are used in making quick drying varnishes the resulting solutions some times are hazy, or, if they are clear when initially produced they may form films which are very hazy and cloudy upon drying. It is to this phenomenon that I refer in the present description by the expression "limited compatibility". The synthetic resins forming the basis of the present invention not only form clear solutions when introduced into lacquer compositions but also yield entirely clear films when the coating compositions are spread out and dried. This avoidance of haziness or cloudiness is referred to in the present description and the appended claims as a "compatibility" characteristic.

An object of the present invention is to provide a synthetic resin having as its component parts a polyhydric alcohol-ester of a polybasic acid and a condensation product of a compound containing the carbonyl-group with a compound of a phenolic character, which resin exhibits the following cardinal properties: (1) solubility in drying oils with the capacity of forming a "quick drying" varnish; (2) miscibility with nitrocellulose solutions to the formation of a durable lacquer suitable for interior and exterior exposure; and (3) compatibility with other cellulose esters, such as cellulose acetate, in its various uses.

Synthetic resins containing esterified natural resin and synthetic resins of the phenol-formaldehyde and alkyd types and having the above-mentioned desirable characteristics, may, in accordance with the present invention, be produced by forming one of the said synthetic resins in the presence of a natural esterifiable resin, and esterifying the natural resin and forming the other of the said synthetic resins in the presence of the first formed synthetic resin (i. e., in the mixture). The esterification of the natural resin may be a distinct step, or it may occur simultaneously with the production of either of the synthetic resins. Thus, I may form a phenol-formaldehyde resin in the presence of a natural esterifiable resin, such, for example, as rosin, add an appropriate amount of a suitable esterification agent such as, for instance, glycerin, bring about the esterification of the natural resin by heating the mixture, and thereafter add to the mixture reacting amounts of a polybasic acid and a polyhydric alcohol and heat the mixture to the formation therein of an alkyd resin. Or, I may carry out the preparation of the phenol-formaldehyde resin in the presence not only of the natural resin but also of a polybasic acid, and thereafter simultaneously esterify the natural resin and produce the alkyd resin by heating the mixture with an appropriate amount of a polyhydric alcohol.

I have found, also, that the same resin product may be prepared by changing the sequence of the above operations so as to first form the alkyd resin in the presence of the natural resin and esterify the latter and then form the phenol-formaldehyde resin in the mixture. It is to be understood, therefore, that the sequence of the operations of synthesizing the new resin which forms the subject matter of the present invention may be varied without departing from the invention. The separate preparation of resin esters, of phenol-formaldehyde resin, and of alkyd resin being old per se, it will be understood, also, that the present invention admits of some latitude in the temperatures and proportions of reactants employed, and in the use of known equivalents as the reactants.

It is not now known whether the components (esterified natural resin, phenol-formaldehyde resin and alkyd resin) of the new synthetic resin are each present in the product as such or whether they have interacted to form new, more complex, resinous bodies. Without advancing any theory to account therefor, it may be noted that the product has properties different from those of any of the components considered separately, and that so far as is known the product is not separable by physical means into the aforesaid components. For convenience in description, however, the product will be referred to hereinafter as being composed of the aforesaid components.

The invention will be more specifically described in connection with the following examples, which are merely illustrative of the process, the parts mentioned being parts by weight, and the temperatures being in centigrade degrees:

*Example 1.*—250 parts of rosin and 25 parts of cresol, U. S. P., are melted together and 8 parts of paraformaldehyde are added at about 100° C. The reaction is allowed to proceed first for 1½ hours at 120–125° C. with refluxing, and then for 1 hour at 220–225° C. with descending condenser to allow the formed water and any excess of reacting compounds to distill off. 25 parts of glycerin are then added, the temperature is raised to 270° C., and the heating continued until the esterification is completed. At this point the reaction mixture appears to consist of a fusion of C—stage synthetic resin of the phenol-formaldehyde type and the esterified natural resin. To the reaction mass allowed to cool down to 180° C., 25 parts of phthalic acid anhydride and 11 parts of glycerin are added, and the whole heated, preferably in an atmosphere of carbon dioxide, for 2 to 3 hours, to 220–240° C. The heating is usualy discontinued when the reaction product shows an acidity of about 15–18. The resulting product is a clear, amber colored resin, melting at about 101–106° C. It is completely soluble in the usual oxygen-containing organic solvents, such as alcohol and acetone, or mixtures of these solvents with hydrocarbons such as toluene, etc. It gives a clear solution when heated with drying oils. To these solutions siccatives, such as cobalt, manganese, and lead resinates, can be added, with the formation of a varnish drying in about four hours. This resin can be incorporated into nitro-cellulose and cellulose acetate solutions with the formation of clear, durable, lacquers.

It will be obvious to one skilled in this art that substitution of known equivalents may be resorted to without departing from the present invention. Thus, I may replace cresol by another phenolic compound such as phenol itself; rosin by another natural esterifiable resin such, for instance, as copal; paraformaldehyde by another methylene-containing hardening agent such as hexamethylene tetramine; formaldehyde, or the like; glycerin by glycol, or other polyhydric alcohol; and phthalic acid anhydride by another polybasic acid, or anhydride thereof, either of the aromatic series or of the aliphatic series, of which diphenic acid, chlorbenzoyl-benzoic acid, malic acid, and succinic acid are examples.

*Example 2.*—A resin is prepared as in Example 1, except that 60 parts of phthalic acid and 25 parts of glycerin are used in the last step. This resin is much harder (m. p. about 115° C.), and is especially adapted for use in cellulose lacquers.

*Example 3.*—65 parts of rosin, 30 parts of phthalic acid anhydride and 25 parts of glycerin are heated to 260° C., for 1½ hours. After cooling, 50 parts of phenol and 17 parts of paraformaldehyde are added and the whole mass is heated to 230° C. for 1 hour. The resulting hard, medium-colored, resin is compatible with cellulose solutions and quite soluble in oil.

*Example 4.*—50 parts of phenol, 30 parts of phthalic acid anhydride, and 65 parts of rosin are heated to 110° C., and to the molten mixture 17 parts of paraformaldehyde are added and the heating continued for 1 hour. The esterification of the free acids of the resulting mass is then accomplished by adding 21 parts of glycerin and heating for 2 hours at 250° C. The acidity of the resulting resin is 11, and the lacquer prepared with it according to the formula below shows very good durability.

A varnish was prepared with resin produced as in Example 1, as follows: 220 parts by weight of tung oil, 20 parts of linseed oil, and 100 parts of the said resin were heated to 300° C., and the heating continued until the proper consistency was reached. The product was then diluted, to a 45% non-volatile content, with mineral spirits, and a solution of lead, manganese, and cobalt resinates was added. The final varnish contained .03% cobalt, .03% manganese, and .6% lead. It showed a viscosity of "G" and a color of "4+" on the respective Gardner-Holdt scales.

The lacquer prepared with the said resin had the following composition:

25 parts ½ second—32 oz.—solution of nitrocellulose.
25 parts toluene.
25 parts 50% solution of the resin in acetone.
4 parts dibutyl phthalate.

It is to be understood that where in the foregoing description and in the appended claims I have used the expressions "polybasic acid", "polyhydric alcohol", "phenolic compound", "methylene-containing hardening agent", "alkyd resin", and the like, the said expressions are to be given their general and well-accepted meanings.

I claim:

1. Process which comprises forming in the presence of a natural esterfiable resin a synthetic resin of the group consisting of alkyd resin and phenol-formaldehyde resin, and esterifying the natural resin and forming in the mixture another synthetic resin of the group consisting of alkyd resin and phenol-formaldehyde resin.

2. Process which comprises forming a synthetic resin of the phenol-formaldehyde type in the presence of a natural esterfiable resin, and esterifying the natural resin and forming a synthetic resin of the alkyd type by reacting a polyhydric alcohol with an organic polybasic acid in the mixture.

3. Process which comprises reacting a phenol with a methylene-containing hardening agent in the presence of a rosin, heating the resulting mixture with a polyhydric alcohol, and reacting an organic polybasic acid with the polyhydric alcohol in the mixture.

4. Process which comprises reacting a phenol with a methylene-containing hardening agent in the presence of rosin and an organic polybasic acid, and heating the resulting mixture with a polyhydric alcohol whereby to esterify the rosin and the polybasic acid.

5. The reaction product obtained by forming in the presence of a natural esterifiable resin a synthetic resin of the group consisting of alkyd resin and phenol-aldehyde resin, and esterifying the natural resin and forming in the mixture another synthetic resin of the aforesaid group, said reaction product being a complex resin having a melting point above 100° C. and being soluble in drying oils, miscible with nitrocellulose solutions and compatible with other cellulose esters to the formation of clear lacquer compositions characterized by freedom from cloudiness when exposed in a thin film.

6. The reaction product obtained by forming in the presence of rosin a synthetic resin of the phenol-aldehyde type and esterifying the rosin and forming in the resulting mixture a synthetic resin of the alkyd type, said reaction product having a melting point above 100° C. and being completely soluble in oxygen-containing organic solvents and in drying oils, and compatible with nitrocellulose and cellulose acetate solutions to the formation of clear lacquer compositions characterized by freedom from cloudiness when exposed in a thin film.

In testimony whereof, I affix my signature.

ELIAS BIELOUSS.